United States Patent Office 3,471,622
Patented Oct. 7, 1969

3,471,622
1,3-BIS-(EPSILON-CARBOXYAMYL) UREA FOR THE TREATMENT OF SEROUS FLUID SATURATION OF THE HUMAN BRAIN CAUSED BY TRAUMA
Walter Oswald, Zurich, Switzerland, assignor to Inventa A.G. fur Forschung und Patentverwertung, Zurich, Switzerland
No Drawing. Filed Apr. 27, 1965, Ser. No. 451,312
Claims priority, application Israel, Apr. 30, 1964, 21,281
Int. Cl. A61k 27/00; C07c 127/16
U.S. Cl. 424—319                  4 Claims

ABSTRACT OF THE DISCLOSURE

An agent for the treatment of serous fluid saturation of the human brain substance and for the treatment of accidents causing a pathologically increased liquid content of the brain. The treatment consists of injection of approximately 5 ml. of an aqueous 1,3-bis-(epsilon-carboxyamyl)-urea solution having a pH of 5. This solution is sterilizable and storable.

---

This invention relates to a novel agent for the treatment of serous fluid saturation of the human brain substance.

The liquid content of the brain tissue plays a decisive role in a number of conditions which influence the consciousness of human beings. This is not only the case with brain edema proper, regardless of whether this has been created on a toxic or any other basis, but also in processes which have been caused traumatically, commonly described as "concussion of the brain" or "commotio cerebri." Especially in such traumatic processes a micromolecular change occurs in the brain structure; on the other hand, an accumulation of liquid just as frequently occurs in the brain tissue proper.

It is known that the conditions named generally react very well to intravenous dropwise infusions of urea solutions. However, this therapy has a number of grave drawbacks.

First of all, an ordinary urea solution is unstable at room temperature; heat sterilization is not feasible due to the ease with which the substance decomposes. A urea solution to be applied therefore must be freshly prepared prior to injection, whereby the solution of the urea in water is accompanied by a temperature drop of said solution, so that the same must be warmed to body temperature. All this can be carried out only under conditions prevailing in a hospital. Attempts at stabilizing the urea solution with invert sugar have not led to storable products. Because of the high urea concentrations required, even minimal quantities of decompositions products have an adverse effect because ammonia forms, so that, for instance, the pH value of the solution changes.

Another grave disadvantage is encountered as is generally the case with any dropwise infusion. This is the long period of time during which a very slight quantity of liquid must be introduced into the blood circulation in regular distribution, by means of a needle imbedded in a blood vessel. The greatest difficulty is encountered with patients whose consciousness is disturbed even slightly since such a patient always tends to tear the discomforting and hurting needle out from his skin and thus from the vein. Hence, the patient must be under constant observation of a skilled person, such as a physician or a trained nurse in order to avert self-infliction of grave damage owing to momentary mental confusion.

It now has been found that the intravenous dropwise infusion of a urea solution for the treatment of serous fluid saturation of the brain substance can be replaced by injection of an aqueous solution of 1,3-bis-(epsilon-carboxyamyl)-urea or urea bicaproate. The treatment simply consists of an intravenous injection of, e.g., 5 ml. of a 5 percent aqueous solution of the material named and is completed within a few seconds.

The aqueous solution is sterilizable in the customary manner and, in fused ampulse, is storable indefinitely provided the usual conditions for storage of medications are observed, i.e., a temperature not exceeding 25° C. and protection from direct sunlight.

The treatment thus started is effective for 12 hours and, in most instances, even for 24 hours. Only after the expiration of that time is a repetition of the instravenous injection required. Experience has shown that this medication improves a status of grave post-commotional confusion within one to two minutes after intravenous application. Objectively, a normalization of the reflexes of the pupils can be taken as a criterion of the effectiveness of the preparation, aside from the improvement of the consciousness of the patient. Disadvantages of the medication have not been found.

For the treatment of a moderately grave case of concussion of the brain accompanied by a very distinct disorder of consciousness and by paradoxical reflexes of the pupils, it suffices that the physician administers an intravenous injection of the doses named above for one week. However, such simple formula of the effect is not extant in the case of a brain edema.

The intravenous injection of the aqueous solution is the preferred embodiment. All other feasible forms of application have the disadvantage of delayed start of effectiveness and much lesser effect. The injection is carried out with the contents of an ampule containing the aqueous solution of 1,3-bis-(epsilon-carboxyamyl)-urea, e.g., 0.1–0.5 gram, and preferably 0.25 g., in 5 ml. solvent. The aqueous solution is readily prepared by dissolving the compound in water while warm and adjustment of the pH to substantially 5. All basic materials commonly used in pharmaceutical practice can be employed for the regulation of the pH, advantageously, e.g., NaOH. The solution thus prepared can be sterilized in the conventional manner.

The invention now will be further explained by the following examples.

EXAMPLE 1

15 g. 1,3-bis-(epsilon-carboxyamyl)-urea were dissolved at 80° C. in 200 ml. distilled water. The pH of 2 ml. of the solution thus obtained then was adjusted to 5.0 at room temperature with 0.1 N aqueous NaOH.

To the remainder of the solution, the required amount of 0.1 N NaOH was added, and the solution then made up to 300 ml. with water. This solution was filled in 5 ml. ampules and sterilized in an autoclave for 30 minutes at 2 atmospheres.

The agent had the following toxicity values:

dl > 1.25 g./kg.—mice, i.p.
  > 0.5 g./kg.—mice, i.v.
  > 0.625 g./kg.—guinea pigs, i.p.

The 1,3-bis-(epsilon-carboxyamyl)-urea (urea bicaproate) had been produced from 1 weight part urea with 8 weight parts epsilon-aminocaproic acid at 135° C. in an autoclave, as described in French Patent 1,267,496, or British Patent 915,474, or German Patent 1,125,419.

EXAMPLE 2

(This example and the ones following are actual case histories.)

The patient had been hit on the head and right shoulder on June 26, 1962, by a falling wooden beam. Above the right frontal bone, in the area of the capillitium, a walnut-sized lump (hematoma) was present. When the patient regained consciousness, he complained of headaches and dizziness and of pains in the area of the right shoulder blade.

Objective observations, aside from the lump: the pupils reacted well to light, but not at all to accommodation.

After intravenous injection of 0.5 g. ureabicaproate as described in Example 1, both pupils reacted distinctly better to accommodation; the light reaction, almost normal before injection, remained unchanged. The patient stated that the headache was gone and that the pain in the shoulder had abated. During the next 11 days, the patient was on bedrest and obtained, during this time, three more intravenous injections of 0.5 g. ureabicaproate each.

On July 9, 1962, the patient visited the physician in his office. The pupilar reflexes again were somewhat sluggish with regard to accommodation, but normal with respect to light. After adminstration of a further intravenous injection, as above, the pupils reacted satisfactorily in all respects. On July 11, 1962, no weakened reaction could be observed. Since the patient maintained that his hearing had been impaired since the accident, he was referred to an otologist, otherwise the case was closed.

Summary

A grave head trauma was healed in a comparatively short time. The gravity of the trauma was established not only by the patient's own description, but by objective indications, and permanent damage to his hearing. In an examination on Apr. 17, 1964, the patient was found entirely free of complaints, aside from the permanent damage to his hearing, since he resumed his work. Particularly, he had not had a headache.

EXAMPLE 3

The patient, a female, fell backward from a running bus onto the street on Jan. 8, 1964. The pupils were almost entirely unsusceptible to light and generally hardly reacted. After an intravenous injection of 0.5 g. ureabicaproate the pupils reacted very well to light, but still little to accommodation. Only after the third injection of the same dosis, on Jan. 15, 1964, the accommodation reflex began to return but was not yet sufficient after the fifth injection on Jan. 20, 1964. After the seventh injection, on Jan. 25, conditions were normal. It should be noted that the patient was not subjected to bed rest at any time and had resumed work, at 50 percent, as early as Feb. 2, 1964, and full time on Feb. 7. The patient has had no complaints since.

Summary

This rather grave trauma also had been healed comparatively rapidly and without consequences even though the patient did not engage in bed rest at any time, against the physician's advice.

EXAMPLE 4

The patient was found unconscious next to his bicycle on Sept. 27, 1962, after 11 p.m. He had a squeeze-tear type wound of more than 10 cm. length on his forehead. Apparently a collision had occurred which, however, could not be reconstructed. The patient was taken to a hospital in unconscious state and, on the following day, had no recollection of his accident. On Oct. 8, 1962, the patient was at home but under a physician's care and complained of very grave headaches and dizziness. During the first days, a medicating therapy deliberately was foregone. However, the condition remained stationary and especially the pupils did not show any change in behavior, i.e., they reacted well to light, but not at all to accommodation. Hence, a therapy of intravenous injections of 0.5 g. each of ureabicaproate was started on Oct. 24, 1962. Even after the first injection, the pupils reacted sufficiently to accommodation, but this improvement did not last. During the following month, 14 injections of ureabicaproate were administered. At that time, i.e., on Nov. 26, 1962, the patient was capable of visiting the physician in his office. Subjectively, the headaches had ceased and dizziness was moderate. This could not be substantiated objectively. Aside from the dizziness, the patient complained of forgetfulness and difficulties in concentrating for a certain time.

Epicrisis

A patient who evidently had suffered a traffic accident and had been found unconscious next to his bicycle was discharged into domestic care after a few days hospitalization. One month after the accident, the pupils still did not react to accommodation. The reaction returned immediately after the first injection of 0.5 g. ureabicaproate but was not permanent. Only after prolonged treatment (14 injections) could the patient's condition objectively be termed normal. Remarkable is the fact that the patient did no longer complain of headaches, even years after the accident, but that subjectively he suffered from dizziness, weakness in concentration and forgetfulness; albeit these complaints could objectively not be established.

EXAMPLE 5

On Mar. 26, 1964, carelessness of a co-worker caused he roof of a truck to fall on the head of a laborer from approximately 1 m. height with full impact. The patient was unconscious for 15 minutes and afterward vomited. He had no recollection of the accident itself. One hour after the accident, the patient's pupils showed a paradoxical light reaction, i.e., they dilated by incidence of light and upon accommodation. In spite of horizontal position of the patient, grave dizziness and headaches were encountered. Upon a finger-nose test and right-handed handshake, a slight aberration toward the right was observed.

After intravenous injection of 0.5 g. ureabicaproate, headache and vomiting impulse subjectively disappeared, and the dizziness improved. The aberration to the right also could no longer be observed. The pupilar reaction was so that a somewhat slow concentration upon light and accommodation occurred. On Apr. 2, 1964, the patient had obtained 4 injections as named above and was subjectively entirely free of his former complaints. Objective remainders after the commotio could no longer be proved, however, the physician prescribed bed rest until Apr. 14, which was followed. The patient resumed his work on May 2, 1964.

Epicrisis

A case of commotio cerebri of more than average gravity improved so fast following the injection of ureabicaproate that the originally intended hospitalization could be renounced in view of the improvement. Subjective as well as objective symptoms had ceased to appear; the cure was complete; and the patient felt entirely well three quarters of a year after the accident.

I claim as my invention:

1. A process for the production of a sterilizable and storable agent for the treatment of serous fluid saturation of the human brain substance which comprises dissolving substantially 0.1–0.5 g. 1,3-bis-(epsilon-carboxyamyl)-urea in 100 ml. water, and adjusting the pH at room temperature to substantially 5 by addition of an aqueous base solution.

2. A process of treating serous fluid saturation of human brain substance caused by trauma which comprises intravenous injection of approximately 5 ml. of a substantially 5 weight percent aqueous solution of 1,3-bis-(epsilon-carboxyamyl)-urea having a pH of substantially 5.

3. A process of treating serous fluid saturation of approximately 5 ml. of human brain substance caused by trauma which comprises intravenous injection of approximately 5 ml. of an aqueous solution of 0.1 to 0.5 g. 1,3- bis-(epsilon-carboxyamyl)-urea having a pH of substantially 5, and repeating said injection within one day to one month until the symptoms of said saturation have disappeared.

4. A process for treating serious fluid saturation of human brain substance caused by trauma which comprises intravenous injection of approximately 5 ml. of an aqueous solution of 0.1 to 0.5 g. 1,3-bis-(epsilon-carboxyamyl)-urea having a pH of substantially 5.

References Cited

FOREIGN PATENTS 801,894   1958   Great Britain.

OTHER REFERENCES

Cecil et al.: Textbook of Medicine, 5th Ed., W. B. Saunders Co., Philadelphia, Pa. (1940), pp. 1537–1538.

Stedman's Medical Dictionary, The Williams & Wilkins Co., Baltimore, Md. (1966), pp. 502–035 and 1554.

ALBERT T. MEYERS, Primary Examiner

VERA C. CLARKE, Assistant Examiner

U.S. Cl. X.R.

260—534